United States Patent
Li et al.

(10) Patent No.: US 12,442,530 B1
(45) Date of Patent: Oct. 14, 2025

(54) AUTOMATIC WATER REPLENISHING CONTROL SYSTEM FOR SLAG REMOVAL

(71) Applicant: YANTAI POWER PLANT OF HUANENG SHANDONG POWER GENERATION CO., LTD., Yantai (CN)

(72) Inventors: Gang Li, Yantai (CN); Chunxiao Li, Yantai (CN); Likun Zheng, Yantai (CN); Zuyi Sun, Yantai (CN); Minzhi Fang, Yantai (CN); Qingjian You, Yantai (CN)

(73) Assignee: YANTAI POWER PLANT OF HUANENG SHANGDONG POWER GENERATION CO., LTD., Shandong (CN)

( * ) Notice: Subject to any disclaimer, the term of this patent is extended or adjusted under 35 U.S.C. 154(b) by 0 days.

(21) Appl. No.: 19/060,797

(22) Filed: Feb. 24, 2025

(30) Foreign Application Priority Data

Aug. 26, 2024 (CN) .......................... 202411170760.7

(51) Int. Cl.
*F23J 1/08* (2006.01)
(52) U.S. Cl.
CPC ..................................... *F23J 1/08* (2013.01)
(58) Field of Classification Search
None
See application file for complete search history.

(56) References Cited

FOREIGN PATENT DOCUMENTS

| | | |
|---|---|---|
| CN | 202066038 U | 12/2011 |
| CN | 102809164 A | 12/2012 |
| CN | 104132354 A | 11/2014 |
| CN | 204345673 U | 5/2015 |
| CN | 105042606 A | 11/2015 |
| CN | 205939189 U | 2/2017 |
| CN | 108413408 A | 8/2018 |
| CN | 118295288 A | 7/2024 |
| DE | 202022103000 U1 | 8/2022 |
| JP | 2012224506 A | 11/2012 |
| RU | 2515935 C2 | 9/2013 |

*Primary Examiner* — Jason Lau
(74) *Attorney, Agent, or Firm* — Ming Jiang; OPENPTO US LLC

(57) ABSTRACT

The disclosure relates to the technical field of boiler slag removal, in particular to an automatic water replenishing control system for slag removal. The system includes: a monitoring unit, used for building multiple monitoring points according to circulation path of cold slag water; the monitoring unit further includes multiple monitoring sub-modules, the monitoring sub-modules are used for collecting cold slag water parameters at each of the monitoring points; a central control unit, used for generating cold slag water loss parameters according to boiler operation parameters, and judging whether to generate a primary water replenishment plan according to the cold slag water loss parameters; the central control unit is further used for generating a cold slag water evaluation value according to water quality parameters of cold slag water at each of the monitoring points, and setting a secondary water replenishment plan according to the cold slag water evaluation value.

8 Claims, 1 Drawing Sheet

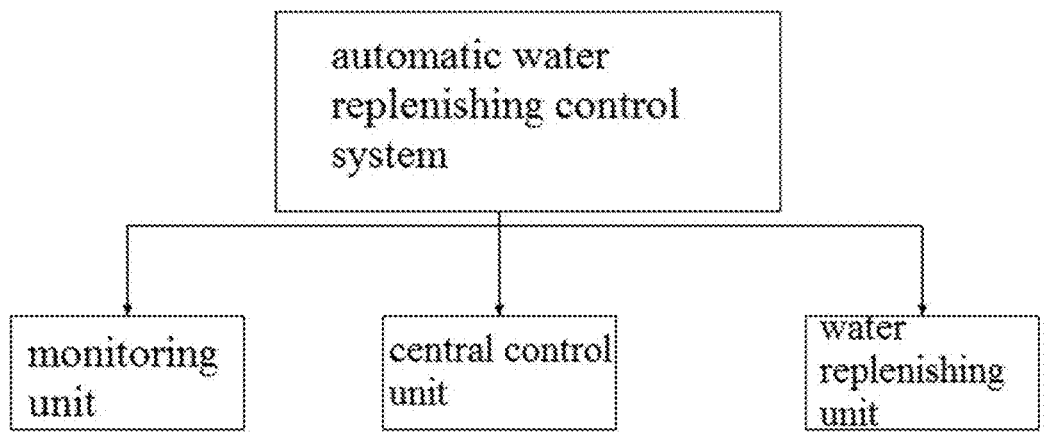

AUTOMATIC WATER REPLENISHING CONTROL SYSTEM FOR SLAG REMOVAL

CROSS-REFERENCE TO RELATED APPLICATIONS

This application claims priority of Chinese Patent Application No. 202411170760.7, filed on Aug. 26, 2024, the content of which is hereby incorporated by reference.

TECHNICAL FIELD

The disclosure relates to the technical field of boiler slag removal, in particular to an automatic water replenishing control system for slag removal.

BACKGROUND

The technology of slag conveyor realizes mechanical slag removal and ash separation. Slag falls into the slag conveyor, cooled by water, crushed by the slag crusher, and finally falls into the slag storage. The overflow water from the slag conveyor and the slag bin can be recycled.

The overflow water of the slag conveyor overflows into the overflow pool through the trench. The cold slag water after preliminary precipitation treatment is first transported to the high-efficiency thickener arranged outside the boiler room through the circulating water pump for filtration and precipitation, and then enters the heat exchanger for cooling. The cold slag water is cooled to about 40° C. in the heat exchanger and then returns to the slag conveyor.

Large coke blocks directly fall into the water tank of the slag conveyor, which will easily lead to the overflow and evaporation of cold slag water, which will make the cold slag water in the slag conveyor drop continuously, thus reducing the slag removal efficiency. In addition, there are also problems such as scaling in the pipeline of the return water system.

SUMMARY

The purpose of this disclosure is to solve the above technical problems, and the disclosure provides an automatic water replenishing control system for slag removal, aiming at ensuring that the cold slag water in the slag conveyor is kept in a safe interval, reducing the scaling probability of the return water pipeline and improving the slag removal efficiency.

In some embodiments of the disclosure, by building multiple monitoring periods, the cold slag water in the slag conveyor is periodically monitored, and the corresponding primary water replenishment plan is set according to the cold slag water accumulated loss amount at the preset feedback time node, so that the water amount of the cold slag water in the slag conveyor is in a reasonable range, the cooling effect on the slag is ensured, and the overall slag removal efficiency is improved.

In some embodiments of the disclosure, the return water pipeline is monitored in different regions by adding monitoring units, and the scaling probability of each monitoring point is obtained by analyzing the collected water quality parameters, and the secondary water replenishment plan is set to dynamically adjust the dosage to avoid the scaling problem of the return water pipeline.

In some embodiments of the disclosure, an automatic water replenishment control system for slag removal is provided, including:

a monitoring unit, used for building multiple monitoring points according to circulation path of cold slag water; where the monitoring unit further includes multiple monitoring sub-modules, where the monitoring sub-modules are used for collecting cold slag water parameters at each of the monitoring points;

a central control unit, used for generating cold slag water loss parameters according to boiler operation parameters, and judging whether to generate a primary water replenishment plan according to the cold slag water loss parameters;

where the central control unit is further used for generating a cold slag water evaluation value according to water quality parameters of cold slag water at each of the monitoring points, and setting a secondary water replenishment plan according to the cold slag water evaluation value;

a water replenishing unit, where the central control unit sets working parameters of the water replenishing unit according to the primary water replenishment plan and the secondary water replenishment plan;

where the central control unit includes:

a first processing module, used for setting multiple feedback time nodes and building multiple monitoring periods according to the feedback time nodes;

a second processing module, used for obtaining slag parameters and generating cold slag water accumulated loss amount at each of the feedback time nodes according to a preset slag-cold slag water loss model;

where the second processing module is further used for judging whether to generate the primary water replenishment plan according to the cold slag water accumulated loss amount;

a third processing module, used for building a monitoring point sequence H according to position parameters of each of the monitoring points, and H=(h1, h2 . . . hi . . . hm), where m is a number of the monitoring points and hi is i-th monitoring point of cold slag water being passed after flows out of a overflow pool;

a fourth processing module, used for obtaining water quality parameters of each of the monitoring points obtained by current feedback time node, and building an impurity content difference value sequence F of the current feedback time node, and $F=(f_1, f_2 \ldots f_i \ldots f_{m-1})$, where $f_i$ is impurity content difference value between i+1-th monitoring point and i-th monitoring point of the current feedback time node;

a fifth processing module, used for generating a cold slag water evaluation value at the current feedback time node, and judging whether to generate the secondary water replenishment plan according to the cold slag water evaluation value at the current feedback time node.

In some embodiments of the disclosure, the water replenishing unit includes:

a first water replenishing module arranged at a water inlet of a slag conveyor, and the central control unit sets working parameters of the first water replenishing module according to the primary water replenishment plan;

a second water replenishing module arranged at an outlet of the overflow pool, and the central control unit sets working parameters of the second water replenishing module according to the secondary water replenishment plan.

In some embodiments of the disclosure, generating cold slag water accumulated loss amount at each of the feedback time nodes includes:

obtaining slag discharge parameters in a monitoring period corresponding to the current feedback time node;

generating a slag average temperature and a slag discharge amount according to the slag discharge parameters;

generating cold slag water evaporation amount a1, cold slag water overflow amount a2 and cold slag water system loss amount a3 in the monitoring period according to the slag average temperature, the slag discharge amount and slag-cold slag water loss amount model;

obtaining cold slag water return flow amount a4 in the monitoring period corresponding to the current feedback time node;

generating cold slag water loss amount b in the monitoring period; and $$b=a1+a2+a3-a4;$$

building a cold slag water loss amount sequence B, and B=(b1, b2, . . . bi, . . . bn), where n is a number of monitoring periods between the current feedback time node and a previous water replenishment time node, and bi is cold slag water loss amount in a monitoring period corresponding to i-th feedback time node after the previous water replenishment time node; bn is cold slag water loss amount in a monitoring period corresponding to the current feedback time node;

generating the cold slag water accumulated loss amount c at the current feedback time node;

$$c = \sum_{i=1}^{n} bi.$$

In some embodiments of the disclosure, judging whether to generate a primary water replenishment plan includes:

presetting a first cold slag water loss amount threshold C1;

if the cold slag water accumulated loss amount c≥C1 at the current feedback time node, generating a primary water replenishment instruction;

obtaining monitoring period number n' between the current feedback time node and the previous water replenishment time node according to the primary water replenishment instruction;

setting a water replenishing speed v according to a ratio d between the cold slag water accumulated loss amount c and the monitoring period number n';

generating the primary water replenishment plan according to the cold slag water accumulated loss amount c and the water replenishing speed v.

In some embodiments of the disclosure, setting the water replenishing speed v includes:

presetting a first ratio interval (D1, D2), a second ratio interval (D2, D3) and a third ratio interval (D3, D4);

if the ratio d is in preset the first ratio interval, setting the water replenishing speed v as a first water replenishing speed V1, that is, v=V1;

if the ratio d is in preset the second ratio interval, setting the water replenishing speed v as a second water replenishing speed V2, that is, v=V2;

if the ratio d is in preset the third ratio interval, setting the water replenishing speed v as a third water replenishing speed V3, that is, v=V3, and V1<V2<V3.

In some embodiments of the disclosure, generating the cold slag water evaluation value at the current feedback time node includes:

sequentially generating a scaling reference value between adjacent monitoring points of the current feedback time node;

$$Qe = \left(\sum_{i=1}^{n1} fei\right) * t/n1;$$

where n1 is a number of monitoring periods between a time node after performing a previous secondary water replenishment plan and the current feedback time node; Qe is a scaling reference value between e+1-th and e-th monitoring points of the current feedback time node; fei is an impurity content difference value between e+1-th and e-th monitoring points corresponding to i-th feedback time node after performing a previous secondary water replenishment plan; t is a time interval between a time node after performing a previous secondary water replenishment plan and the current feedback time node;

generating a cold slag water evaluation value g of the current feedback time node;

$$g = \sum_{i=1}^{m-1} \beta i * Qi;$$

wherein Qi is a sealing reference value between i+1-th and i-th monitoring points of the current feedback time node; βi is an influencing factor of Qi.

In some embodiments of the disclosure, judging whether to generate a secondary water replenishment plan includes:

presetting a first cold slag water evaluation value threshold G';

if g≥G', generating a secondary water replenishment instruction at the current feedback time node;

according to the secondary water replenishment instruction and the cold slag water evaluation value g, setting dosage j and dosage speed;

according to the dosage j and the dosage speed, generating the secondary water replenishment plan.

In some embodiments of the disclosure, setting dosage j includes:

presetting a first cold slag water evaluation value interval (G1, G2), a second cold slag water evaluation value interval (G2, G3) and a third cold slag water evaluation value interval (G3, G4);

if the cold slag water evaluation value g is in preset the first cold slag water evaluation value interval, setting the dosage j as preset first dosage J1, that is, j=J1;

if the cold slag water evaluation value g is in preset the second cold slag water evaluation value interval, setting the dosage j as preset second dosage J2, that is, j=J2;

if the cold slag water evaluation value g is in preset the third cold slag water evaluation value interval, setting the dosage j as preset third dosage J3, that is, j=J3, and J1<J2<J3.

Compared with the prior art, the automatic water replenishing control system for slag removal in the embodiment of the disclosure has the following beneficial effects:

By building multiple monitoring periods, the cold slag water in the slag conveyor is periodically monitored, and the corresponding primary water replenishment plan is set according to the cold slag water accumulated loss amount at the preset feedback time node, so that the water amount of the cold slag water in the slag conveyor is in a reasonable range, the cooling effect on the slag is ensured, and the overall slag removal efficiency is improved.

The return water pipeline is monitored in different regions by adding monitoring units, and the scaling probability of each monitoring point is obtained by analyzing the collected water quality parameters, and the secondary water replenishment plan is set to dynamically adjust the dosage to avoid the scaling problem of the return water pipeline.

BRIEF DESCRIPTION OF THE DRAWINGS

FIG. 1 is a schematic structural diagram of an automatic water replenishing control system for slag removal in a preferred embodiment according to the embodiments of the disclosure.

DETAILED DESCRIPTION OF THE EMBODIMENTS

In the following, the specific embodiments of the disclosure will be further described in detail with the attached drawings and embodiments. The following embodiments are used to illustrate this disclosure, but are not used to limit the scope of this disclosure.

In the description of this disclosure, it should be understood that the terms the azimuth or positional relationship indicated by "center", "up", "down", "front", "back", "left", "right", "vertical", "horizontal", "top", "bottom", "inside" and "outside" and so on is based on the azimuth or positional relationship shown in the attached drawings, only for the convenience of describing this disclosure and simplifying the description, and does not indicate or imply that the devices or elements referred to must have a specific orientation, be constructed and operated in a specific orientation, so it cannot be understood as a limitation of this disclosure.

The terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of this disclosure, unless otherwise specified, "multiple" means two or more.

In the description of this disclosure, it should be noted that unless otherwise specified and limited, the terms "installation", "connecting" and "connection" should be broadly understood, for example, they can be fixed connection, detachable connection or integrated connection. They can be a mechanical connection or an electrical connection; They can be directly connected, can also be indirectly connected through an intermediate medium, and can be connected inside two elements. For those skilled in the art, the specific meanings of the above terms in this disclosure can be understood in specific circumstances. As shown in FIG. 1, a preferred embodiment in the embodiments of the disclosure provides an automatic water replenishing control system for slag removal, which includes:

a monitoring unit, used for building multiple monitoring points according to circulation path of cold slag water;

where the monitoring unit further includes multiple monitoring sub-modules, where the monitoring sub-modules are used for collecting cold slag water parameters at each of the monitoring points;

a central control unit, used for generating cold slag water loss parameters according to boiler operation parameters, and judging whether to generate a primary water replenishment plan according to the cold slag water loss parameters;

where the central control unit is further used for generating a cold slag water evaluation value according to water quality parameters of cold slag water at each of the monitoring points, and setting a secondary water replenishment plan according to the cold slag water evaluation value;

a water replenishing unit, where the central control unit sets working parameters of the water replenishing unit according to the primary water replenishment plan and the secondary water replenishment plan;

where the central control unit includes:

a first processing module, used for setting multiple feedback time nodes and building multiple monitoring periods according to the feedback time nodes;

a second processing module, used for obtaining slag parameters and generating cold slag water accumulated loss amount at each of the feedback time nodes according to a preset slag-cold slag water loss model;

where the second processing module is further used for judging whether to generate the primary water replenishment plan according to the cold slag water accumulated loss amount;

a third processing module, used for building a monitoring point sequence H according to position parameters of each of the monitoring points, and H=(h1, h2 . . . hi . . . hm), where m is a number of the monitoring points and hi is i-th monitoring point of cold slag water being passed after flows out of a overflow pool;

a fourth processing module, used for obtaining water quality parameters of each of the monitoring points obtained by current feedback time node, and building an impurity content difference value sequence F of the current feedback time node, and $F=(f_1, f_2 \ldots f_i \ldots f_{m-1})$, where $f_i$ is impurity content difference value between i+1-th monitoring point and i-th monitoring point of the current feedback time node;

a fifth processing module, used for generating a cold slag water evaluation value at the current feedback time node, and judging whether to generate the secondary water replenishment plan according to the cold slag water evaluation value at the current feedback time node.

Specifically, the water replenishing unit includes:

a first water replenishing module arranged at a water inlet of a slag conveyor, and the central control unit sets working parameters of the first water replenishing module according to the primary water replenishment plan;

a second water replenishing module arranged at an outlet of the overflow pool, and the central control unit sets working parameters of the second water replenishing module according to the secondary water replenishment plan.

Specifically, in the above embodiment, the primary water replenishment plan is built to periodically replenish the cold slag water in the slag conveyor, so as to ensure that the water amount of the cold slag water in the slag conveyor is in a safe interval, and at the same time, the replenishing water containing the descaling agent is added to the cold slag water that overflows and circulates through the secondary water replenishment plan, so as to reduce the scaling probability of the return water pipeline.

In a preferred embodiment in the embodiments of the disclosure, generating cold slag water accumulated loss amount at each of the feedback time nodes includes:

slag discharge parameters in a monitoring period corresponding to the current feedback time node are obtained;

a slag average temperature and a slag discharge amount are generated according to the slag discharge parameters;

cold slag water evaporation amount a1, cold slag water overflow amount a2 and cold slag water system loss amount a3 in the monitoring period are generated according to the slag average temperature, the slag discharge amount and slag-cold slag water loss amount model;

cold slag water return flow amount a4 in the monitoring period corresponding to the current feedback time node is obtained;

cold slag water loss amount b in the monitoring period is generated; and $b=a1+a2+a3-a4$;

a cold slag water loss amount sequence B is built, and B=(b1, b2, . . . bi, . . . bn), where n is a number of monitoring periods between the current feedback time node and a previous water replenishment time node, and bi is cold slag water loss amount in a monitoring period corresponding to i-th feedback time node after the previous water replenishment time node; bn is cold slag water loss amount in a monitoring period corresponding to the current feedback time node;

the cold slag water accumulated loss amount c at the current feedback time node is generated;

$$c = \sum_{i=1}^{n} bi.$$

Specifically, the slag discharge amount and slag temperature of the boiler are collected by setting a weight sensing device and a temperature sensing device.

Specifically, according to the principle of evaporation heat transfer, the evaporation model of cold slag water in contact with hot slag is constructed, so as to build the fitting model between slag discharge amount, slag average temperature and cold slag water evaporation amount, and generate the slag-cold slag water loss model according to the fitting results. According to the collected real-time slag discharge amount and the slag average temperature, the corresponding cold slag water evaporation amount a1 is generated.

Specifically, by building a slag-cold slag water loss model, the cold slag water evaporation amount in a single monitoring period is generated according to the real-time slag discharge amount and the slag average temperature, and the cold slag water overflow amount is generated according to the slag discharge amount and the real-time water amount in the slag conveyor, and the cold slag water system loss amount is generated according to the slag conveying amount in the current monitoring period.

Specifically, the cold slag water system loss amount refers to the total amount of cold slag water taken away by slag during slag conveying by slag conveyor. The cold slag water return flow refers to the overflow cold slag water total amount that has been purified and returned to the slag conveyor in the current monitoring period.

Specifically, the cold slag water system loss amount refers to the inevitable loss in the operation process, that is, the loss caused by the operation process of the slag removal system. The cold slag water system loss amount can be analyzed according to the historical actual operation parameters of the slag removal system, and then the system loss amount in unit time can be set, and the corresponding cold slag water system loss amount a3 can be generated in combination with the monitoring period.

Specifically, multiple flow sensors are arranged on the circulating path of the cold slag water (the overflow water of the slag conveyor overflows to the overflow pool through the trench, and the cold slag water returns to the pipeline in the slag conveyor after being treated), so as to obtain the parameters such as the overflow amount a2 of the cold slag water, the return flow a4 of the cold slag water and the like.

Specifically, judging whether to generate a primary water replenishment plan includes:

a first cold slag water loss amount threshold C1 is preset;

if the cold slag water accumulated loss amount c≥C1 at the current feedback time node, a primary water replenishment instruction is generated;

monitoring period number n' between the current feedback time node and the previous water replenishment time node is obtained according to the primary water replenishment instruction;

a water replenishing speed v is set according to a ratio d between the cold slag water accumulated loss amount c and the monitoring period number n';

the primary water replenishment plan is generated according to the cold slag water accumulated loss amount c and the water replenishment speed v.

Specifically, according to the analysis of historical operation parameters of different slag remover systems, the corresponding first cold slag water loss amount threshold can be set, and the first cold slag water loss amount threshold means that when the loss amount reaches the current value, its cold slag efficiency will be greatly reduced. When the cold slag water accumulated loss amount c exceeds the first cold slag water loss amount threshold, it means that there is less cold slag water in the slag conveyor at present, which will affect the efficiency of cold slag. At this time, it is necessary to generate a primary water replenishment plan to replenish the cold slag water in the slag conveyor in time to ensure the efficiency of cold slag.

Specifically, the water replenishment amount in the primary water replenishment plan is the cold slag water accumulated loss amount C, and the water replenishment is continued according to the preset water replenishment speed v, and the water replenishment is stopped when the water replenishment amount reaches the preset value.

Specifically, setting the water replenishing speed v includes:

a first ratio interval (D1, D2), a second ratio interval (D2, D3) and a third ratio interval (D3, D4) are preset;

if the ratio d is in preset the first ratio interval, the water replenishing speed v is set as a first water replenishing speed V1, that is, v=V1;

if the ratio d is in preset the second ratio interval, the water replenishing speed v is set as a second water replenishing speed V2, that is, v=V2;

if the ratio d is in preset the third ratio interval, the water replenishing speed v is set as a third water replenishing speed V3, that is, v=V3, and V1<V2<V3.

Specifically, the greater the cold slag water accumulated loss amount c and the monitoring period n', it shows that the greater the loss speed of cold slag water in the current slag remover system, the corresponding water replenishment speed should also be adjusted in gradient, and the setting of the ratio interval and the specific value of the corresponding water replenishment speed can be set according to the different historical operating parameters of different slag removers.

Specifically, the water replenishing speed is dynamically set according to the ratio of the cold slag water accumulated loss amount c to the monitoring period number n', so as to avoid the problem that the water level in the slag conveyor rises rapidly and the overflow risk is increased due to a large amount of water replenishing in a short period.

In a preferred embodiment in the embodiments of the disclosure, generating the cold slag water evaluation value at the current feedback time node includes:

a scaling reference value between adjacent monitoring points of the current feedback time node is sequentially generated;

$$Qe = \left(\sum_{i=1}^{n1} fei\right) * t/n1;$$

where n1 is a number of monitoring periods between a time node after performing a previous secondary water replenishment plan and the current feedback time node; Qe is a scaling reference value between e+1-th and e-th monitoring points of the current feedback time node; fei is an impurity content difference value between e+1-th and e-th monitoring points corresponding to i-th feedback time node after performing a previous secondary water replenishment plan; t is a time interval between a time node after performing a previous secondary water replenishment plan and the current feedback time node;

a cold slag water evaluation value g of the current feedback time node is generated;

$$g = \sum_{i=1}^{m-1} \beta i * Qi;$$

where Qi is a scaling reference value between i+1-th and i-th monitoring points of the current feedback time node; βi is an influencing factor of Qi.

Specifically, the value range of the influence factor is [0.8, 1.2], and the scaling probability between each of the monitoring points is generated according to the historical monitoring parameters of the pipeline, and the average value of scaling probability is generated. The greater the scaling probability between two adjacent monitoring points, the greater the corresponding influence factor, and the specific value relationship can be set according to the actual production parameters. If the scaling probability is less than the average value, the value of the influence factor is less than 1, and if the scaling probability is greater than the average value, the value of the influence factor is greater than 1.

Specifically, the variation of impurity content in cold slag water between two adjacent monitoring points is judged by building the impurity content difference value sequence F. If the difference value is large, it shows that there are more impurities in the pipeline between two adjacent monitoring points at present. The greater the probability of scaling.

Specifically, by building a scaling evaluation value model, the scaling risk of pipelines between adjacent monitoring points is periodically corrected, so that the scaling evaluation value can more accurately reflect the scaling risk in pipelines.

Specifically, judging whether to generate a secondary water replenishment plan includes:

a first cold slag water evaluation value threshold G' is preset;

if g≥G', a secondary water replenishment instruction at the current feedback time node is generated;

according to the secondary water replenishment instruction and the cold slag water evaluation value g, dosage j and dosage speed are set;

according to the dosage j and the dosage speed, the secondary water replenishment plan is generated.

Specifically, setting dosage j includes:

a first cold slag water evaluation value interval (G1, G2), a second cold slag water evaluation value interval (G2, G3) and a third cold slag water evaluation value interval (G3, G4) are preset;

if the cold slag water evaluation value g is in the preset first cold slag water evaluation value interval, the dosage j is set as preset first dosage J1, that is, j=J1;

if the cold slag water evaluation value g is in the preset second cold slag water evaluation value interval, the dosage j is set as preset second dosage J2, that is, j=J2;

if the cold slag water evaluation value g is in the preset third cold slag water evaluation value interval, the dosage j is set as preset third dosage J3, that is, j=J3, and J1<J2<J3.

Specifically, the first cold slag water evaluation value threshold can be set according to the historical monitoring parameters of the pipeline, which means that the cold slag water in the current pipeline will greatly increase the scaling probability of the pipeline, and below the threshold, the impurities in the cold slag water in the current pipeline are in a safe range.

Specifically, according to the historical descaling and dosing parameters of the slag remover system, the greater the cold slag water evaluation value, the more impurities there are, the greater the possibility of pipeline scaling, and the more corresponding dosing amount should be. The fitting function between the cold slag water evaluation value and the dosage is built, so as to set the corresponding cold slag water evaluation value interval and the corresponding dosage, so as to realize gradient adjustment.

Specifically, the return water pipeline is comprehensively monitored by generating the cold slag water evaluation value, and according to the cold slag water evaluation value, the corresponding dosage and dosing speed are dynamically set, so as to eliminate the scaling risk of return water pipeline, ensure the safe operation of the slag removal system.

According to the first concept of the disclosure, by building multiple monitoring periods, the cold slag water in the slag conveyor is periodically monitored, and the corresponding primary water replenishment plan is set according to the cold slag water accumulated loss amount at the preset feedback time node, so that the water amount of the cold slag water in the slag conveyor is in a reasonable range, the cooling effect on the slag is ensured, and the overall slag removal efficiency is improved.

According to the second concept of the disclosure, the return water pipeline is monitored in different regions by adding monitoring units, and the scaling probability of each monitoring point is obtained by analyzing the collected water quality parameters, and the secondary water replenishment plan is set to dynamically adjust the dosage to avoid the scaling problem of the return water pipeline.

What has been described above is only the preferred embodiment of the disclosure. It should be pointed out that some improvements and substitutions can be made by ordinary skilled in this technical field without departing from the technical principles of the disclosure, and these improvements and substitutions should also be regarded as the protection scope of the disclosure.

What is claimed is:

1. An automatic water replenishing control system for slag removal, comprising:
    a monitoring unit, used for building a plurality of monitoring points according to circulation path of cold slag water;
    wherein the monitoring unit further comprises a plurality of monitoring sub-modules, wherein the monitoring sub-modules are used for collecting cold slag water parameters at each of the monitoring points;
    a central control unit, used for generating cold slag water loss parameters according to boiler operation parameters, and judging whether to generate a primary water replenishment plan according to the cold slag water loss parameters;
    wherein the central control unit is further used for generating a cold slag water evaluation value according to water quality parameters of cold slag water at each of the monitoring points, and setting a secondary water replenishment plan according to the cold slag water evaluation value;
    a water replenishing unit, wherein the central control unit sets working parameters of the water replenishing unit according to the primary water replenishment plan and the secondary water replenishment plan;
    wherein the central control unit comprises:
    a first processing module, used for setting a plurality of feedback time nodes and building a plurality of monitoring periods according to the feedback time nodes;
    a second processing module, used for obtaining slag parameters and generating cold slag water accumulated loss amount at each of the feedback time nodes according to a preset slag-cold slag water loss model;
    wherein the second processing module is further used for judging whether to generate the primary water replenishment plan according to the cold slag water accumulated loss amount;
    a third processing module, used for building a monitoring point sequence H according to position parameters of each of the monitoring points, and H=(h1, h2 . . . hi . . . hm), wherein m is a number of the monitoring points and hi is i-th monitoring point of cold slag water being passed after flows out of a overflow pool;
    a fourth processing module, used for obtaining water quality parameters of each of the monitoring points obtained by current feedback time node, and building an impurity content difference value sequence F of the current feedback time node, and $F=(f_1, f_2 \ldots f_i \ldots f_{m-1})$, wherein $f_i$ is impurity content difference value between i+1-th monitoring point and i-th monitoring point of the current feedback time node;
    a fifth processing module, used for generating a cold slag water evaluation value at the current feedback time node, and judging whether to generate the secondary water replenishment plan according to the cold slag water evaluation value at the current feedback time node.

2. The automatic water replenishing control system for slag removal according to claim 1, wherein the water replenishing unit comprises:
    a first water replenishing module arranged at a water inlet of a slag conveyor, and the central control unit sets working parameters of the first water replenishing module according to the primary water replenishment plan;
    a second water replenishing module arranged at an outlet of the overflow pool, and the central control unit sets working parameters of the second water replenishing module according to the secondary water replenishment plan.

3. The automatic water replenishing control system for slag removal according to claim 2, wherein generating cold slag water accumulated loss amount at each of the feedback time nodes comprises:
    obtaining slag discharge parameters in a monitoring period corresponding to the current feedback time node;
    generating a slag average temperature and a slag discharge amount according to the slag discharge parameters;
    generating cold slag water evaporation amount a1, cold slag water overflow amount a2 and cold slag water system loss amount a3 in the monitoring period according to the slag average temperature, the slag discharge amount and slag-cold slag water loss amount model;
    obtaining cold slag water return flow amount a4 in the monitoring period corresponding to the current feedback time node;
    generating cold slag water loss amount b in the monitoring period; and $b=a1+a2+a3-a4;$ building a cold slag water loss amount sequence B, and B=(b1, b2, . . . bi, . . . bn), wherein n is a number of monitoring periods between the current feedback time node and a previous water replenishment time node, and bi is cold slag water loss amount in a monitoring period corresponding to i-th feedback time node after the previous water replenishment time node; bn is cold slag water loss amount in a monitoring period corresponding to the current feedback time node;
    generating the cold slag water accumulated loss amount c at the current feedback time node;

$$c = \sum_{i=1}^{n} bi.$$

4. The automatic water replenishing control system for slag removal according to claim 3, wherein judging whether to generate a primary water replenishment plan comprises:
    presetting a first cold slag water loss amount threshold C1;
    if the cold slag water accumulated loss amount c≥C1 at the current feedback time node, generating a primary water replenishment instruction;
    obtaining monitoring period number n' between the current feedback time node and the previous water replenishment time node according to the primary water replenishment instruction;
    setting a water replenishing speed v according to a ratio d between the cold slag water accumulated loss amount c and the monitoring period number n';

generating the primary water replenishment plan according to the cold slag water accumulated loss amount c and the water replenishing speed v.

5. The automatic water replenishing control system for slag removal according to claim 4, wherein setting the water replenishing speed v comprises:
presetting a first ratio interval (D1, D2), a second ratio interval (D2, D3) and a third ratio interval (D3, D4);
if the ratio d is in preset the first ratio interval, setting the water replenishing speed v as a first water replenishing speed V1, that is, v=V1;
if the ratio d is in preset the second ratio interval, setting the water replenishing speed v as a second water replenishing speed V2, that is, v=V2;
if the ratio d is in preset the third ratio interval, setting the water replenishing speed v as a third water replenishing speed V3, that is, v=V3, and V1<V2<V3.

6. The automatic water replenishing control system for slag removal according to claim 2, wherein generating the cold slag water evaluation value at the current feedback time node comprises:
sequentially generating a scaling reference value between adjacent monitoring points of the current feedback time node;

$$Qe = \left(\sum_{i=1}^{n1} fei\right) * t/n1;$$

wherein n1 is a number of monitoring periods between a time node after performing a previous secondary water replenishment plan and the current feedback time node; Qe is a scaling reference value between e+1-th and e-th monitoring points of the current feedback time node; fei is an impurity content difference value between e+1-th and e-th monitoring points corresponding to i-th feedback time node after performing a previous secondary water replenishment plan; t is a time interval between a time node after performing a previous secondary water replenishment plan and the current feedback time node;

generating a cold slag water evaluation value g of the current feedback time node;

$$g = \sum_{i=1}^{m-1} \beta i * Qi;$$

wherein Qi is a scaling reference value between i+1-th and i-th monitoring points of the current feedback time node; βi is an influencing factor of Qi.

7. The automatic water replenishing control system for slag removal according to claim 6, wherein judging whether to generate a secondary water replenishment plan comprises:
presetting a first cold slag water evaluation value threshold G';
if g≥G', generating a secondary water replenishment instruction at the current feedback time node;
according to the secondary water replenishment instruction and the cold slag water evaluation value g, setting dosage j and dosage speed;
according to the dosage j and the dosage speed, generating the secondary water replenishment plan.

8. The automatic water replenishing control system for slag removal according to claim 7, wherein setting dosage j comprises:
presetting a first cold slag water evaluation value interval (G1, G2), a second cold slag water evaluation value interval (G2, G3) and a third cold slag water evaluation value interval (G3, G4);
if the cold slag water evaluation value g is in preset the first cold slag water evaluation value interval, setting the dosage j as preset first dosage J1, that is, j=J1;
if the cold slag water evaluation value g is in preset the second cold slag water evaluation value interval, setting the dosage j as preset second dosage J2, that is, j=J2;
if the cold slag water evaluation value g is in preset the third cold slag water evaluation value interval, setting the dosage j as preset third dosage J3, that is, j=J3, and J1<J2<J3.

* * * * *